United States Patent
Lee et al.

(10) Patent No.: US 8,262,973 B2
(45) Date of Patent: Sep. 11, 2012

(54) MICROPOROUS POLYOLEFIN FILM WITH IMPROVED MELTDOWN PROPERTY AND PREPARING METHOD THEREOF

(75) Inventors: Young-Keun Lee, Seoul (KR);
Jang-Weon Rhee, Daejeon (KR);
Gwi-Gwon Kang, Daejeon (KR);
In-Hwa Jung, Chungnam (KR); Je-An Lee, Daejeon (KR)

(73) Assignee: SK Innovation Co., Ltd. (KR)

( * ) Notice: Subject to any disclaimer, the term of this patent is extended or adjusted under 35 U.S.C. 154(b) by 1572 days.

(21) Appl. No.: 11/654,450

(22) Filed: Jan. 17, 2007

(65) Prior Publication Data

US 2007/0190304 A1    Aug. 16, 2007

Related U.S. Application Data

(63) Continuation-in-part of application No. 11/407,631, filed on Apr. 20, 2006, now abandoned.

(30) Foreign Application Priority Data

Feb. 14, 2006 (KR) .................. 10-2006-0013923

(51) Int. Cl.
*D02J 1/06* (2006.01)
(52) U.S. Cl. .................................................. 264/288.8
(58) Field of Classification Search .................. 264/288, 264/210.7, 235.8, 288.8
See application file for complete search history.

(56) References Cited

U.S. PATENT DOCUMENTS

| | | | |
|---|---|---|---|
| 4,247,498 A | 1/1981 | Castro | 264/41 |
| 4,539,256 A | 9/1985 | Shipman | 428/315.5 |
| 4,588,633 A | 5/1986 | Kono et al. | 428/220 |
| 4,873,034 A | 10/1989 | Kono et al. | 264/41 |
| 5,051,183 A | 9/1991 | Takita et al. | 210/500.36 |
| 5,453,333 A * | 9/1995 | Takauchi et al. | 429/62 |
| 5,641,565 A | 6/1997 | Sogo | 428/315.7 |
| 5,691,077 A | 11/1997 | Yu | 429/62 |
| 5,786,396 A | 7/1998 | Takita et al. | 521/64 |
| 6,127,438 A | 10/2000 | Hasegawa et al. | 521/64 |
| 6,562,519 B2 | 5/2003 | Yamamoto et al. | 429/247 |
| 6,949,315 B1 | 9/2005 | Samii et al. | 429/251 |
| 6,982,341 B1 | 1/2006 | Kim et al. | |
| 2007/0052130 A1 * | 3/2007 | Lee et al. | 264/210.7 |

FOREIGN PATENT DOCUMENTS

| | | |
|---|---|---|
| JP | 6-212006 | 8/1994 |
| JP | 6-234876 | 8/1994 |
| JP | 9-259858 | 10/1997 |
| WO | WO 2005/121228 | * 12/2005 |
| WO | WO 2006/123849 | * 11/2006 |

OTHER PUBLICATIONS

Chang Gyoun Kim et al., "Aminoalkoxide Groups As Monovalent Bidentate Ligands for the Precursors to Various Metals and Metal Oxides and the Applications of the Precursors in MOCVD and ALD," Chemical vapor deposition, 2005, pp. 614-625.
Nikolay N. Zemlyansky et al., "New Stable Germylenes, Stannylenes, and Related Compounds. 1. Stable Germanium (II) and Tin(II) Compounds M(OCH2CH2NMe2)2 (M=Ge, Sn) With Intramolecular Coordination Metal-Nitrogen Bonds. Synthesis and Structure," 2003 American Chemical Society, Organometallics, 2003, vol. 22, No. 8, pp. 1675-1681.

* cited by examiner

*Primary Examiner* — Larry Thrower
(74) *Attorney, Agent, or Firm* — Cantor Colburn LLP

(57) ABSTRACT

The present invention is related to microporous polyolefin films that may be used for battery separators and the methods of manufacturing the same. These microporous polyolefin films are characterized by being manufactured in a method comprising the steps of melt-extruding a composition, comprised of 20-50 weight % of a resin composition, comprised of 90-98 weight % of polyethylene (Component I) having a weight average molecular weight of $2\times10^5 \sim 4\times10^5$ and less than 5 weight % of molecules of which molecular weight is less than $1\times10^4$ and less than 5 weight % of molecules of which molecular weight is greater than $1\times10^6$, and 2-10 weight % of polypropylene (Component II) of which weight average molecular weight is $3.0\times10^4 \sim 8.0\times10^5$ and the peak of the melting point is higher than 145° C., and 80-50 weight % of a diluent (Component III), to mold in the form of sheets; stretching the above sheets to the form of films; extracting the diluent from the above films; and heat-setting the above films. They are also characterized by having a puncture strength of greater than 0.14 N/μm, Darcy's permeability constant of greater than $1.5\times10^{-5}$ Darcy, shut-down temperature of microporous films of lower than 140° C., and melt-down temperature of higher than 160° C. They can enhance the performance and stability of batteries using them as well as the productivity of microporous films owing to their high thermal stability and superior extrusion compoundability and physical properties.

7 Claims, No Drawings

MICROPOROUS POLYOLEFIN FILM WITH IMPROVED MELTDOWN PROPERTY AND PREPARING METHOD THEREOF

CROSS REFERENCE TO RELATED APPLICATIONS

This application is a continuation-in-part of U.S. patent application Ser. No. 11/407,631 filed on Apr. 20, 2006, now abandoned which claims priority to and the benefit of Korean Patent Application No. 10-2006-0013923 filed on Feb. 14, 2006, both of which are incorporated by reference herein in their entirety.

TECHNICAL FIELD

The present invention is related to microporous polyolefin films having superior melt-down property and methods of manufacturing the same. More precisely, the present invention is related to microporous polyolefin films that can enhance the performance and stability of batteries using these films in that they have superior extrusion compoundability and physical properties as well as superior melt-down property and high productivity. The present invention is also related to the methods of manufacturing the same.

PRIOR ART

Microporous polyolefin films have been used widely for various battery separators, separation filters, microfiltration membranes, etc. owing to their superior chemical stability and superior physical properties. Among them, secondary battery separators require for the highest-level quality along with a high stability. Recently, it has been required to have thermal stability for separators in accordance with the trend of the high capacity and high power of secondary batteries. Particularly, in case of lithium secondary batteries, there is a danger of explosion due to melt-down of separators coming from overheating of batteries if the thermal stability of separators is poor.

General methods of manufacture of porous films are introduced in U.S. Pat. No. 4,247,498. Disclosed in this patent is the technology of manufacturing microporous polyolefin films by making a thermodynamically single-phase solution by blending polyethylene and a compatible liquid compound at a high temperature, cooling the solution, and performing solid-liquid or liquid-liquid phase separation of polyethylene and the compatible liquid during the process of cooling.

Also disclosed in U.S. Pat. No. 4,539,256 is the basic method of manufacturing microporous films through extrusion of polyethylene and a compatible liquid compound, and stretching and extracting them.

The typical method of improving the strength of microporous films is to increase the molecular weight of a polymer used by blending or using ultrahigh-molecular-weight polyolefins (UHMWPO) having a weight average molecular weight of about 1,000,000.

Further, disclosed in U.S. Pat. No. 5,051,183 are microporous polyolefin films using a composition containing 10~50 weight % of polyolefin containing greater than 1% of ultrahigh-molecular-weight polyolefin having a weight average molecular weight of greater than 700,000 and 90~50 weight % of a solvent such as a mineral oil, etc., and having a polydisperse index (weight average molecular weight/number average molecular weight) of 10~300. The method of forming pores is to form porous films by extruding the above composition to make gel-phase sheets, stretching the sheets at a temperature between the melting point of the composition and the melting point +10° C., and extracting the solvent. However, this method leads to blending of ultrahigh-molecular-weight polyolefins as well as a broad molecular weight distribution and an excessive amount of polyolefins having large molecular weights. This further leads to lowering of stretchability since chain entanglement among molecules may occur seriously. That is, film breakage at a high stretching speed and high stretching ratio or non-uniform stretching phenomenon at a low stretching ratio may occur.

The methods of solving the above problems include making the composition soft by increasing the stretching temperature during stretching or obtaining the same effect as that of increasing the temperature of the composition by slowing down the stretching speed. Still, to the contrary, there occurs a problem of lowering physical properties of the final porous films as the orientation of the resin becomes minor during stretching and stretching effects are lowered. Also, films that are made of resins having a broad molecular weight distribution generally have many defects due to molecules having small molecular weights compared to the films made of resins having a narrow molecular weight distribution, thus lowering impact strength and puncture strength. These phenomena are not exceptional for microporous films, and puncture strength, which is one of important physical properties of microporous films, is not sufficiently high if the distribution of molecular weight becomes broad. That is, the effects of ultrahigh-molecular-weight polyolefins added to improve physical properties are not shown sufficiently. Such problems appear in Japanese Laid-Open Patent No. H06-234876, Japanese Laid-Open Patent No. H06-212006, and U.S. Pat. No. 5,786,396 that disclose similar technologies.

Such problems in processing according to the use of ultrahigh-molecular-weight polyolefins are general and induce problems such as increase in extrusion load, lowering of physical mixing capability with a compatible compound, increase in the load of a stretching machine during stretching, occurrence of non-uniform stretching, lowering of productivity according to lowering of the stretching speed and stretching ratio, etc.

Further disclosed in U.S. Pat. Nos. 4,588,633 and 4,873,034 are processes of manufacturing microporous films by using ultrahigh-molecular-weight polyolefins having a weight average molecular weight of greater than 500,000 and an excessive amount of a solvent that can dissolve polyolefin at a high temperature, and going through 2-step solvent extraction process and stretching process. However, these methods are disadvantageous in that an excessive amount of a solvent should be used during the process of extrusion in order to improve compoundability and extrudability of the compound, which is a disadvantage of ultrahigh-molecular-weight polyolefins, and this solvent should be extracted in the first step and extracted again after stretching.

The thermal stability of separators in batteries is determined according to the shut-down temperature and melt-down temperature. The shut-down temperature is a temperature at which no more current can flow since micropores of separators are closed when the inner temperature of batteries is increased abnormally. The melt-down temperature is a temperature at which current flows again owing to melt-down of separators when the temperature of batteries is increased continuously much higher than the shut-down temperature. It is preferable that the shut-down temperature is low but the melt-down temperature is high for the stability of batteries. Particularly, the melt-down temperature is a temperature at which current can be remained cut-off when it is likely to induce the explosion of batteries, and is very closely related to the safety of batteries.

Efforts to improve the thermal stability of separation membranes have been developed in three directions largely: a method of cross-linking separation membranes, a method of adding inorganic compounds, and a method of using heat-resistant resins.

Among them, the method of cross-linking separation membranes is shown in U.S. Pat. Nos. 6,127,438 and 6,562,519. This method is a method of radiation cross-linking or chemical cross-linking of films. However, in case of radiation cross-linking, this method is disadvantageous in that it is necessary to install radiation cross-linking equipment using radiation, the speed of production is restricted, and there is a non-uniformity in quality coming from local or non-uniform cross-linking. Whereas, in case of chemical cross-linking, this method is disadvantageous in that the process of extrusion compounding is complicated, it is likely to have gels generated in the films due to local or non-uniform cross-linking, and it is necessary to perform long-time high-temperature aging. That is, the increase in heat resistance according to the method of cross-linking may bring about increase in inefficiency during the process of production and non-uniformity in quality.

Still further, disclosed in U.S. Pat. No. 6,949,315 is a method of improving the thermal stability of separation membranes by compounding an inorganic material, such as 5-15 weight % of titanium oxide, to ultrahigh-molecular-weight polyethylene. However, this method is disadvantageous in that it is likely to have problems in using ultrahigh-molecular-weight resins as well as problems of lowering compoundability according to the input of inorganic materials, and non-uniform quality and generation of pinholes according to low compoundability. And physical properties of films such as impact strength, etc. are lowered due to lack of compatibility of the interface between the inorganic material and the polymer resin.

The typical method of using resins having a superior heat resistance in order to increase the thermal stability of separation membranes is to make multi-layered separation membranes through the lamination of resins having a high melting point.

Disclosed in U.S. Pat. No. 5,691,077 is a method of manufacturing 3-layered separation membranes through the lamination of a polypropylene having a superior thermal stability (having a high melting point) to polyethylene having a superior shut-down property (having a low melting point). These separation membranes produced according to the drying process (a process of making pores by stretching the resin without a diluent) have not been widely used due to disadvantages such as non-uniform stretching, generation of pinholes, increased deviation in thickness, etc. during the process of manufacture of the base films along with the problems of lowered productivity due to the addition of the lamination process as a separate process as well as the problem of delamination coming from inferior lamination although they have superior thermal characteristics. In spite of a superior heat resistance, the films manufactured according to this method have low strength, permeability, uniformity in quality, and productivity that are essential for separation membranes for the secondary batteries.

Another method of increasing the thermal stability of separation membranes is to compound and use resins having a superior heat resistance, which is disclosed in U.S. Pat. No. 5,641,565. In this method, separation membranes are made by compounding the resin mixture, in which polyethylene comprised of greater than 10 weight % of molecules having a weight average molecular weight of greater than 1,000,000 but greater than 5 weight % of molecules having a weight average molecular weight of less than 100,000 and 5-45 weight % of polypropylene are mixed, with 30-75 weight % of an organic liquid compound and 10-50 weight % of an inorganic material, and extracting the organic liquid compound and the inorganic material. This technology needs to have an inorganic material, polyethylene, and ultrahigh-molecular-weight molecules in order to prevent lowering of physical properties coming from the addition of polypropylene, which is a incompatible resin with polyethylene. However, this method may still have problems of an excessive amount of ultrahigh-molecular-weight molecules as well as problems of lowering of compoundability according to the use of an inorganic material and non-uniform quality and generation of pinholes according to low compoundability. At the same time, the existence of low-molecular-weight molecules may lead to broadening of the molecular weight distribution and lowering of physical properties. Such example may be found in Japanese Laid-Open Patent No. H09-259858. It is seen in the preferred embodiment of that patent that the tensile strength of porous polyethylene films manufactured according to such method is at a comparatively low level. Also, this method is disadvantageous in that it has complicated processes due to the addition of the processes for extracting and removing the inorganic material used, and a comparatively large amount of polypropylene is required in order to obtain sufficient effects.

The essential characteristics of separation membranes of the secondary batteries are strength, permeability, uniform quality, and productivity, and additionally, thermal stability. However, prior art described in the above use ultrahigh-molecular-weight resins in order to increase physical properties or use inorganic materials in manufacturing separation membranes, and have problems in processing such as the addition of further processes, etc., and therefore, it is difficult to meet every required characteristics of the separation membranes of the secondary batteries simultaneously.

SUMMARY OF THE INVENTION

Accordingly, the inventors of the present invention repeated extensive studies in order to solve problems with prior art described in the above, and completed the present invention in light of the fact that it is possible to manufacture separation membranes having superior thermal stability (melt-down property) as well as strength, permeability, uniform quality, and productivity by maximizing mixing of a small amount of a polypropylene having a superior thermal stability without using ultrahigh-molecular-weight polyethylene or inorganic materials while maintaining the contents of low-molecular-weight polyethylene molecules and high-molecular-weight polyethylene molecules contained in general-molecular-weight polyethylene to be less than specific contents.

It is, therefore, an object of the present invention to provide microporous polyolefin films having a high thermal stability and superior extrusion compoundability and physical properties and enabling increase in the performance and stability of batteries using such microporous membranes and increase in the productivity of microporous films themselves.

Microporous polyolefin films according to the present invention to fulfill the above object are characterized by being manufactured in a method comprising the steps of melt-extruding a composition, comprised of 20-50 weight % of a resin composition, comprised of 90-98 weight 6 of polyethylene (Component I) having a weight average molecular weight of $2\times10^5$~$4\times10^5$ and less than 5 weight % of molecules of which molecular weight is less than $1\times10^4$ and less than 5 weight % of molecules of which molecular weight is greater than $1\times10^6$, and 2-10 weight % of polypropylene (Component II) of which weight average molecular weight is $3.0\times10^4$~$8.0\times10^5$ and the peak of the melting point is higher than 145° C., and 80-50 weight % of a diluent (Component III), to mold in the form of sheets; stretching the above sheets in the form of films; extracting the diluent from the above films; and heat-setting the above films. They are also characterized by having a puncture strength of greater than 0.14 N/μm, Darcy's permeability constant of greater than $1.5\times10^{-5}$ Darcy, shut-down temperature of microporous films lower than 140□, and melt-down temperature higher than 160° C.

Hereinafter, the method of manufacture of microporous polyolefin films from polyolefin used in the present invention is illustrated in more detail below:

A low-molecular-weight organic material (hereinafter referred to as a diluent) having a similar molecular structure to that of polyolefin forms a thermodynamically single phase with polyolefin at the temperature higher than the melting temperature of polyolefin. Phase separation between polyolefin and the diluent occurs during the process of cooling if polyolefin and the diluent solution in the thermodynamically single phase are cooled to a room temperature. Each phase which is subject to phase separation is comprised of a polyolefin-rich phase, mainly lamella, which is the crystal portion of polyolefin and a diluent-rich phase comprised of a small amount of polyolefin dissolved in the diluent even at a room temperature and the diluent. Porous polyolefin films are made by extracting the diluent with an organic solvent after cooling.

Accordingly, the basic structure of microporous films is determined during the process of phase separation. That is, the pore size and structure of the final microporous films are determined according to the size and structure of the diluent-rich phase formed during the process of phase separation, and the basic physical properties of microporous films are affected by the structure of crystals of polyolefin made during the process of extraction of the diluent.

As a result of long-term studies, the inventors of the present invention found the following fact: a amount of polyolefin existing in the diluent-rich phase should be as small as possible in order to make superior microporous films. That is, no defect should be made in polyolefin, which is the matrix, during the process of extraction of the diluent, which is affected mostly by low-molecular-weight polyolefin molecules contained in polyolefin.

As a result of making products by using polyolefin having less low-molecular-weight materials based on the above, it is possible to make microporous polyolefin films having superior physical properties and an uniform pore structure with a resin having smaller molecular weights than those of the conventional inventions, thus leading to greatly improved processibility.

In the present invention, as Component I, 90-98 weight % of polyethylene, having a weight average molecular weight of $2\times10^5$~$4\times10^5$ and less than 5 weight % of molecules having the molecular weight of less than $1\times10^4$ and less than 5 weight % of molecules having the molecular weight of greater than $1\times10^6$, is used.

Generally, commercially produced or used polyethylene has its molecular weights distributed inevitably, and polyethylenes even having a weight average molecular weight of over $1\times10^6$ have a part of molecules having the molecular weight of several thousands. These low-molecular-weight materials have been polymerized sometimes intentionally during the process of production of polyethylene since they have assumed a role of improving the processibility of resins having large molecular weights when they have been used for blown films, blow molding, etc. that have been general uses of polyethylene commercially. However, during the process of making microporous polyethylene films, these low-molecular-weight materials lower perfection of lamella, which is the crystal portion of polyethylene, in the polyethylene-rich phase, and also lower the number of tie molecules connecting lamellas, thus reducing the strength of the entire polyethylene. Further, they have a high affinity to the diluent and exist mostly in the diluent-rich phase, and therefore, exist in the interface of the pores after extraction, which makes the interface of pores incomplete, thus lowering porosity. This phenomenon is shown in molecules having molecular weights of less than $1\times10^4$ and is significantly critical when their content exceeds 5 weight %.

Another problem with the existence of molecular weight distribution is the existence of ultrahigh-molecular-weight molecules. That is, there exist ultrahigh-molecular-weight molecules having the molecular weights of over $1\times10^6$ in polyethylenes having a weight average molecular weight of about $1\times10^5$. The existence of such ultrahigh-molecular-weight molecules assumes the role of increasing the strength of sheets. But the existence of an excessive amount of ultrahigh-molecular-weight molecules induces the problem of generation of gels coming from lowering of compoundability due to a large difference in viscosity from that of the diluent, and makes the surface of sheets extruded rough. One way of solving this problem is to increase the extrusion temperature or to increase the shear rate of the screw configuration of the screw element of the biaxial compounder. However, in this case, the resin is deteriorated and physical properties are lowered. Since this problem is shown greatly when the content of ultrahigh-molecular-weight molecules having the molecular weight of over $1\times10^6$ exceeds 5 weight %, it is preferable that the content of ultrahigh-molecular-weight molecules having the molecular weight of over $1\times10^6$ is less than 5 weight %.

Accordingly, it is seen in the present invention that it is possible to make microporous polyethylene films having superior physical properties and an even cell structure by using polyethylene having a sufficiently small low-molecular-weight part as well as a sufficiently small ultrahigh-molecular-weight part, i.e., polyethylene having less than 5 weight % of molecules having the molecular weight of less than $1\times10^4$ as well as less than 5 weight % of molecules having the molecular weight of greater than $1\times10^6$, and to greatly improve processibility.

Available polyethylene includes homo-polyethylene (high-density polyethylene) and co-monomers, i.e., polyethylene characterized by that less than 20 weight % is alpha-olefin having 3-8 carbon atoms such as propylene, butene-1, hexene-1,4-methylpentene-1, octene-1, etc. or their combination, and their mixture. If the content of the co-monomer exceeds 20 weight %, the crystallinity of polyethylene itself is lowered greatly, and the strength of polyethylene as separation membranes can not be maintained and also the melt-down temperature of separation membranes becomes very low.

Polyethylene has superior physical properties and chemical stability, and is advantageous in that its shut-down temperature is lowered if it is used for the matrix of the secondary battery separators owing to its low melting point. However, this characteristic brings about a disadvantage of lowering the melt-down temperature at the same time. In the present invention, polypropylene is used in order to take advantage of the low shut-down temperature of polyethylene and to complement the disadvantage of the low melt-down temperature simultaneously.

Polypropylene (Component II) having a weight average molecular weight of $3.0 \times 10^4 \sim 8.0 \times 10^5$ and the peak of the melting temperatures of higher than 145° C. is used for the present invention, and its content is 2-10 weight %. 80-50 weight % of the diluent (Component III) is mixed and used with respect to 20-50 weight % of the resin composition of polyethylene (Component I) and poypropylene (Component II).

Polypropylene is a polyolefin-group resin such as polyethylene. Compared to other heterogeneous resins, polypropylene has a good interchangeability but is subject to phase separation thermodynamically with polyethylene. In other words, if polyethylene and polypropylene are subject to melt-extrusion for the resin only, two phases are separated, and a phase having a less volume fraction in the equilibrium state is separated and isolated. If 95 weight % of polyethylene and 5 weight % of polypropylene are subject to melt-compounding through the extrusion for the resin only, 5 weight % of polypropylene is completely separated from 95 weight % of polyethylene forming the matrix and exists in the form of an island. In order for compounded polypropylene to sufficiently demonstrate the increasing effect of the melt-down temperature, polypropylene should have been distributed in a sufficiently micro size. That is, in order to prevent melt-down of the matrix even at a temperature higher than the melting temperature of polyethylene forming the matrix, it is advantageous that compounded polypropylene is distributed as small as possible, more advantageous, if it is connected to each other. In order to maximize such dispersibility of polypropylene, the weight average molecular weight of polypropylene is adjusted, and the extrusion method utilizing the diluent is used in the present invention.

It is preferable that the weight average molecular weight of polypropylene is $3.3 \times 10^4 \sim 8.0 \times 10^5$ for the micro dispersion of polypropylene. Factors for determining the dispersion of polypropylene within polyethylene include thermodynamic factors and physical factors. For thermodynamic dispersibility, the less the molecular weight of polypropylene is, the more advantageous it is. But the smaller the molecular weight of polypropylene becomes, the severer the phenomena of lowering of the physical properties of separation membranes and of migration of low-molecular-weight materials on the surface become. Physical dispersion is something that is determined by mixing of the screw in the extruder. What are very critical are the viscosity of the phase forming the matrix (polyethylene in case of the present invention) and the viscosity of the phase to be mixed in (polypropylene in case of the present invention). For superior dispersion, it is preferable that the viscosity of the phase to be mixed in is less than the viscosity of the phase forming the matrix. But if it is too less, friction of the interface becomes small and dispersion is obstructed. Dispersibility is lowered also when the viscosity of the phase to be mixed in is large, in which case the melt-down characteristic is not improved greatly and extrudability is lowered. More preferably, the viscosity of polypropylene is 1/1-1/100 of the viscosity of polyethylene forming the matrix. The weight average molecular weight of polypropylene satisfying the above condition is greater than $2.0 \times 10^5$ but less than $4.5 \times 10^5$. This enables to obtain significant outcome that physical properties are not lowered even if polypropylene is added, extrudability as well as dispersibility are superior, and melt-down characteristic is greatly improved.

It is also preferable that the content of polypropylene with respect to that of polyethylene is 2-10 weight %. If the content of polypropylene is less than 2 weight %, it is difficult to obtain such effect; and if the content of polypropylene exceeds 10 weight %, the physical properties of separation membranes may be lowered. It is because the interface between polyethylene and polypropylene becomes weak due to incompatibility. It is, therefore, preferable that the content of polypropylene should be minimized within the range that the required melt-down characteristic is obtained. The desirable content of polypropylene is 3-5 weight %.

Any polypropylene characterized by that the peak of the melting temperatures is higher than 145° C. may be used for polypropylene. For example, homo-polypropylene; random polypropylene using alpha-olefin having 2-8 carbon atoms such as ethylene, butene-1, hexene-1,4-methylpentene-1, octene-1, etc. as co-monomers or their combination; and polypropylene containing polypropylene using alpha-olefin having 2-8 carbon atoms such as ethylene, propylene, butene-1, hexene-1,4-methylpentene-1, octene-1, etc. or their mixtures as co-monomers, and their mixture may be used. If the peak of melting temperatures is lower than 145° C., the effect of improving the melt-down characteristic is not great enough.

Polyethylene (Component I) and polypropylene (Component II) are melt-extruded along with a diluent (Component III). As described in the above, the diluent is used for two purposes: to make pores after it is melt-extruded and stretched, and further, extracted; and to maximize the dispersion of polypropylene within polyethylene.

A low-molecular-weight organic material (diluent) having a similar molecular structure to that of polyolefin forms a thermodynamic single phase with polyolefin at a high temperature at which polyolefin is melted. That is, the resin mixture of polyethylene and polypropylene may be compounded in the thermodynamic single phase if it is used along with a proper diluent, contrary to melt-extrusion of a resin only. The formation of a thermodynamic single phase increase the dispersion to the molecular scale. Rapid cooling of a mixture compounded in the molecular scale enables maintaining of maximized dispersion even after the mixture is cooled to the solid state, in which case the effects of improving the melt-down characteristic by adding polypropylene are maximized. Accordingly, the type of a diluent, the content of the diluent, and speed of cooling after melt-extrusion are very important factors in the present invention.

The diluent used in the present invention should form a single phase with a resin at the melt-extrusion processing temperature of the resin mixture. Examples of diluents include aliphatic or cyclic hydrocarbons such as nonane, decane, decalin, paraffin oil, etc.; phthalic acid esters such as dibutyl phthalate, dioctyl phthalate, etc.; aromatic ethers such as diphenyl ether, etc.; fatty acids having 10 to 20 carbon atoms such as stearic acid, oleic acid, linoleic acid, linolenic acid, etc.; fatty acid alcohols having 10 to 20 carbon atoms such as stearic acid alcohol, oleic acid alcohol, etc.; and one or more fatty acid esters in which one or more fatty acids selected from saturated and unsaturated fatty acids having 4 to 26 carbon atoms in the fatty acid group such as palmitic acid mono-, di-, or tri-ester, stearic acid mono-, di-, or tri-ester, oleic acid mono-, di-, or tri-ester, linoleic acid mono-, di-, or tri-ester, etc. are ester-bonded with alcohols having 1 to 8 hydroxy radicals and 1 to 10 carbon atoms. The kinetic viscosity of a desirable diluent is 0.5 cSt~30 cSt at 100° C. If the viscosity of a diluent exceeds 30 cSt, there may occur problems such as an increased load, inferior surface of sheets and films, etc. due to a high kinetic viscosity during the process of extrusion, as well as difficulty in extraction, lowered productivity, reduced permeability due to the remaining oil, etc. during the process of extraction. On the other hand, if the viscosity of a diluent is less than 0.5 cSt, it is difficult to compound during the process of extrusion due to the difference in viscosity from the resin melted in the extruder.

It is preferable that 20~50 weight % of the resin mixture of polyethylene and polypropylene is mixed with 80~50 weight % of a diluent in the present invention. If the content of the resin mixture exceeds 50 weight % (i.e., if the content of the diluent is less than 50 weight %), it is difficult to form the single phase of polyethylene and polypropylene since the viscosity of the molten material becomes greatly high and the speed of thermodynamic diffusion is lowered. That is, the effect of improving the melt-down characteristic is lowered. Also, porosity is reduced and the pore size becomes smaller in the characteristics of the final films after the extraction of the diluent, and permeability is lowered greatly since interconnection among pores becomes minor. On the other hand, if the content of the resin mixture is less than 20 weight % (i.e., if the content of the diluent exceeds 80 weight %), the friction between the resin mixture and the diluent in the extruder is lowered greatly; as a result of which there may occur problems of breakage of film, non-uniform thickness, etc. during stretching since compoundability is lowered and the resin mixture is extruded in the form of a gel without being compounded thermodynamically with the diluent; and it is difficult to expect to improve the melt-down characteristic.

If necessary, general additives for improving specific functions such as anti-oxidants, UV stabilizers, anti-static agents, etc. may be further added to the above composition.

For compounding of the above composition, a twin screw extruder, kneader, Banbury mixer, etc. designed for compounding of the diluent and polyolefin may be used. The extrusion temperature should be higher than the temperature at which the diluent and the resin may be made in the thermodynamically single phase but below the temperature at which thermal oxidation is progressed and physical properties of the resin may be lowered. If paraffin oil is used for the diluent, the temperature should be higher than 160° C. but lower than 270° C. The resin and the diluent may be fed into the compounder after they are blended previously, or fed separately from separate feeder.

Thus compounded molten material is extruded through a die and molded in the form of sheets while being cooled. Any general casting or calendering process using air or water cooling method may be used for making molded products in the form of sheets from the molten material. What is important here is the speed of cooling of the molten material. The molten material made in the single phase thermodynamically during the process of melt extrusion is subject to phase separation during the process of cooling. At this time, phase separation between the resin and the diluent is progressed simultaneously with phase separation among the resins. That is, if the speed of cooling of the molten material is too slow, phase separation between polyethylene and polypropylene is progressed excessively, and dispersity of polypropylene within polyethylene is lowered greatly. Then, the effect of improving the melt-down characteristic according to compounding of polypropylene is reduced and lowering of physical properties is increased. Accordingly, the speed of cooling of the molten material should be faster than 10° C./second, more preferably, faster than 100° C./second.

Thus molded sheets are stretched in the form of films through the process of stretching, after which the diluent is extracted from the films to make microporous films.

Stretching of the sheets made through compounding, extrusion, and cooing may be done in the roll-type or tenter-type, sequential or simultaneous stretching. Here, it is preferable that the ratio of stretching is greater than 3 times each in the machine and transverse directions and the total ratio of stretching is 25~50 times. If the ratio of stretching in one direction is less than 3 times, the tensile strength, puncture strength, etc. are lowered since orientation in one direction is not sufficient and the balance in physical properties in the machine and transverse directions is disturbed. Also, if the total ratio of stretching is less than 25 times, incomplete and non-uniform stretching occurs; and if it exceeds 50 times, it is likely that breakage occurs during stretching, and the shrinkage of the final films is increased.

At this time, the temperature of stretching varies according to the melting point of polyethylene forming the matrix used and the concentration and type of the diluent. It is proper that the optimum temperature of stretching is selected from the temperature range at which 30~80 weight % of the crystal portion of polyethylene in the above molded products of the sheet is molten. If the temperature of stretching is selected from the temperature range which is lower than the temperature at which 30 weight % of the crystal portion of polyethylene in the above molded products of sheet is melted, stretchability is lowered since softness of the films is lost, and therefore, it is likely that breakage occurs during stretching and non-uniform stretching may occur at the same time. To the contrary, if the temperature of stretching is selected from the temperature range which is higher than the temperature at which 80 weight % of the crystal portion is molten, stretching may be done readily and non-uniform stretching may occur less, but there may occur deviation in thickness due to partial excessive stretching and physical properties are lowered greatly since the orientation effect of the resin is insignificant. The degree of melting of the crystal portion according to the temperature may be obtained through differential scanning colorimetry (DSC) of the molded products of the sheets.

Stretched films are then extracted and dried by using an organic solvent. Organic solvents that may be used in the present invention are not limited specially, but any solvent that can extract the diluent used for the extrusion of the resin may be used. It is preferable to use methyl ethyl ketone, methylene chloride, hexane, etc. that may be extracted efficiently and dried promptly. As to the processes of extraction, all general processes of extraction of solvents such as immersion process, solvent spray process, ultrasonic process, etc. may be used individually or in combination with each other. During extraction, the content of the remaining diluent should be less than 1 weight %. If the content of the remaining diluent exceeds 1 weight %, physical properties are lowered and the permeability of films is reduced. The amount (ratio of extraction) of the remaining diluent depends greatly on the temperature and time of extraction. It is better that the temperature of extraction is high to increase the solubility of the diluent and solvent, but is lower than 40° C. in view of the safety in boiling of the solvent. However, the temperature of extraction should be higher than the solidification point of the diluent at all times since the efficiency of extraction is lowered greatly if the temperature of extraction is lower than the solidification point of the diluent. The time of extraction varies according to the thickness of films to be produced, but 2~4 minutes is proper in case of producing 10- to 30-μm-thick microporous films.

Finally, dried films go through the heat-setting step to remove their residual stress in order to reduce the shrinkage of the final films. Heat setting is to remove residual stress by setting the films, adding heat, and holding the films to be shrinked forcefully. It is advantageous for lowering of the shrinkage that the temperature of heat setting is high. But if it is too high, the films are partially molten and permeability is lowered as micropores thus formed are closed. It is preferable that the temperature of heat setting is selected from the temperature range at which 10~30 weight % of the crystal portion of the films is molten. If the temperature of heat setting is selected from the temperature range which is lower than the temperature at which 10 weight % of the crystal portion of the above films is molten, it is not effective to remove residual stress of the films as the reorientation of polyethylene molecules within the films is minor; and if it is selected from the temperature range which is higher than the temperature at which 30 weight % of the crystal portion of the films is molten, micropores are closed and permeability is lowered due to partial melting.

Here, the time of heat setting should be short relatively if the temperature of heat setting is high, and if the temperature of heat setting is low, it may be made long relatively. It is preferable that the time of heat setting is for about 20 seconds to 2 minutes if the tenter-type continuous heat-setting equipment is used. Most preferably, the time of heat setting is for about 1 to 2 minutes in the temperature range at which 10~15 weight % of the crystal portion of the films is molten, or for about 20 seconds to 1 minute in the temperature range at which 15~30 weight % of the crystal portion of the films is molten.

Microporous polyolefin films of the present invention manufactured as described in the above have the following physical properties:

(1) Puncture Strength is Greater than 0.14 N/m.

Puncture strength is a value showing the strength of films with respect to that of sharp articles. When the films are used for battery separators, if the puncture strength is not sufficient, the films are broken due to abnormality on the surface of electrodes or dendrite occurring on the surface of electrodes when using batteries, and short may occur. The films having the puncture strength of greater than 0.14 N/μm according to the present invention may be used safety for the secondary battery separators.

(2) Darcy's Permeability Constant is Greater than $1.5\times10^{-5}$ Darcy.

It is better to have a high gas permeability. If Darcy's permeability constant is less than $1.5\times10^{-5}$ Darcy, the efficiency as porous films is lowered, and the ion permeability and charging/discharging characteristics in batteries are lowered. That is, the films having the Darcy's permeability constant of greater than $1.5\times10^{-5}$ Darcy according to the present invention have superior charging/discharging characteristics, superior low-temperature characteristics, and long lifetime of batteries.

(3) Shut-Down Temperature of Microporous Films is Lower than 140° C. and Melt-Down Temperature is Higher than 160° C.

Shut-down temperature is a temperature at which no more current flow as micropores of batteries are closed when the internal temperature of batteries is increased abnormally. Melt-down temperature is a temperature at which current flows again as separators are melted down when the temperature of batteries is increased continuously much higher than the shut-down temperature. It is better that the shut-down temperature is low and the melt-down temperature is high for the safety of batteries. Particularly, melt-down temperature is a temperature at which current may be remained cut off under the circumstance that the explosion of batteries may occur, and is most closely related to the safety of batteries. The microporous films according to the present invention have the shut-down temperature of below 140° C. maintaining the low shut-down temperature of microporous polyethylene films. At the same time, they have the melt-down temperature of higher than 160° C., which is higher than 145° C., i.e., the melt-down temperature of the case that polyethylene is used singly, by greater than 15° C., thus improving the thermal stability of batteries remarkably.

The microporous films according to the present invention having the above characteristics have a high thermal stability as well as superior extrusion compoundability and physical properties, and therefore, can improve the performance and stability of the batteries using them as well as the productivity of microporous films.

DESCRIPTION OF PREFERRED EMBODIMENTS OF THE INVENTION

The present invention is illustrated in more detail in terms of the following preferred embodiments:

Molecular weights of polyethylene and polypropylene and the molecular weight distribution were measured with high-temperature GPC (Gel Permeation Chromatography, Model GPC-210) of Polymer Laboratory Company. The calibration of molecular weights was done by measuring the standard samples of polyethylene and polypropylene of Polymer Laboratory Company and correcting Q-factor after obtaining calibration curves by using standard polystyrene samples (EasiCal PSI-A, B) of Polymer Laboratory Company.

The viscosity of the diluent was measured with CAV-4 Automatic Viscometer of Cannon Company.

Polyethylene and the diluent were compounded in a $\phi$=30 mm twin screw extruder. The temperature of extrusion was 180~240° C., and the residence time was 3 minutes. The compounded molten material was extruded from T-shaped dies and molded in the form of sheets by using a casting roll. At this time, the thickness of sheets was adjusted to 600~1,200 μm in order to adjust the thickness of the final films to 16±1 μm after the stretching, extraction, and heat setting. In order to see whether there were gels due to inferior melting and compounding, 200-μm-thick films were manufactured separately, and the number of gels in the area of 2,000 cm² was counted. For the manufacture of high-quality microporous films, the number of gels per 2,000 cm² should be less than 20, which was defined to be the case of superior extrusion compoundability. The sheets were cooled by cooling the casting roll with water at a speed of 200° C./second.

The sheets molded were analyzed with a DSC (Differential Scanning Calorimeter) in order to analyze the phenomenon of melting for determining the temperature of stretching. The conditions for analysis were 5 mg for the weight of samples and 10° C./minute for the rate of scanning.

Stretching of the sheets was progressed by simultaneous stretching in a tenter-type stretching machine with the stretching ratio of 6×6 at the stretching speed of 2.0 m/minute while changing the temperature of stretching. The temperature of stretching according to the present invention was determined within the temperature range at which 30~80 weight % of the crystal portion of polyethylene in the molded products of the sheets was molten based on the results of DSC.

The diluent was extracted in the immersion process by using methylene chloride for 4 minutes.

Heat setting was performed in a convection oven at 122° C. for 1 minute and 30 seconds after drying the films, from which the diluent was extracted, in the air, and fixing the films to a frame.

Tensile strength, puncture strength, gas permeability, shut-down temperature of separation membranes, and melt-down temperature of the films thus manufactured, that were the most important physical properties of microporous films, were measured, and the results were shown in the following tables:

(1) Tensile strength was measured with ASTM D882.

(2) Puncture strength was measured in terms of the strength of breakage of the films by a 0.5-mm-diameter pin at a speed of 120 mm/minute.

(3) Gas permeability was measured with a porometer (CFP-1500-AEL of PMI Company). Although gas permeability is indicated in terms of Gurley number generally, it is difficult to obtain the relative permeability according to the pore structure of the films themselves since the effect of the thickness of the films is not corrected in employing the Gurley number. In order to solve this problem, Darcy's permeability constant was used in the present invention. Darcy's permeability constant may be obtained according to the following Equation 1, where nitrogen is used in the present invention:

$$C=(8FTV)/(\pi D^2(P^2-1))$$

where C=Darcy's permeability constant
F=Flow rate
T=Thickness of a sample
V=Viscosity of a gas (0.185 for $N_2$)
D=Diameter of a sample
P=Pressure In the present invention, an average value of Darcy's permeability constants in the region of 100~200 psi was used.

(4) The shut-down and melt-down temperature of separation membranes were measured in simple cells, in which the impedance of separation membranes may be measured. Simple cells were assembled by positioning separation membranes between two graphite electrodes having channels and closely attaching copper plates, assuming the role of current collectors, to both sides of graphite electrodes. Electric resistance value was measured by an impedance analyzer by connecting wires to the copper plates after injecting an electrolyte solution to the assembled cells through graphite electrode channels so that the separation membranes were soaked sufficiently. Alternating current (5 mV) of 1 kHz was used for the measurement of the electric resistance value.

A liquid electrolyte in which hexafluorophosphate ($LiPF_6$) is diluted in an electrolyte solution, in which ethylene carbonate and propylene carbonate were mixed at a volume ratio of 1:1, to have a concentration of 1 mole was used for the electrolyte solution. The electric resistance value was measured after injecting the electrolyte solution while increasing the temperature of cells from 25° C. to 200° C. at a speed of 5° C./minute. The electric resistance value was maintained to be about 0.5-5Ω continuously, and then, was increased to about 500~several thousands Ω abruptly at a specific temperature, which was defined to be the shut-down temperature. If the temperature of the cells was increased continuously, the electric resistance value was reduced again. The temperature at which the electric resistance value of the cells was lowered below 100Ω was defined to be the melt-down temperature. It was not possible to measure the electric resistance at a temperature higher than 200° C. since the vaporization of the electrolyte solution occurred at that temperature, and the melt-down temperature was marked to be over 200° C. if the electric resistance was not lowered below 100Ω even at 200° C.

PREFERRED EMBODIMENT 1

High-density polyethylene not containing a co-monomer but having a weight average molecular weight of $3.0\times10^5$ and containing 3.5 weight % of molecules having the molecular weight of lower than $10^4$ and 4.9 weight % of molecules having the molecular weight of greater than $10^6$ was used for Component I. And homo-polypropylene having a weight average molecular weight of $5.7\times10^5$ and melting point of 162° C. was used for Component II. The contents of Component I and Component II were 95 weight % and 5 weight %, respectively. Paraffin oil of which 100° C. kinetic viscosity was 11 cSt (Component A in the following table) was used for Component III, and the content of Component III with respect to the entire content of Components I, II, and III was 70 weight %. The temperatures of both the extruder and die were 180° C.

Stretching was done at 115° C. in order to adjust the ratio of melting of the crystal portion to 30 weight % during stretching. Other conditions for stretching and processing were the same as described in the above.

PREFERRED EMBODIMENT 2

High-density polyethylene not containing a co-monomer but having a weight average molecular weight of $2.5\times10^5$ and containing 4.8 weight % of molecules having the molecular weight of lower than $10^4$ and 4.5 weight % of molecules having the molecular weight of greater than $10^6$ was used for Component I. And homo-polypropylene having a weight average molecular weight of $2.9\times10^5$ and melting point of 162° C. was used for Component II. The contents of Component I and Component II were 97 weight % and 3 weight %, respectively. A diluent in which dibutyl phthalate and paraffin oil were mixed at a ratio of 1:2, 100° C. kinetic viscosity was 11 cSt, (Component B in the following table) was used for Component III, and the content of Component III with respect to the entire content of Components I, II, and III was 60 weight %. The temperatures of both the extruder and die were 240° C.

Stretching was done at 120° C. in order to adjust the ratio of melting of the crystal portion to 50 weight % during stretching.

PREFERRED EMBODIMENT 3

High-density polyethylene having a weight average molecular weight of $2.9\times10^5$, containing 4.9 weight % of molecules having the molecular weight of lower than $10^4$ and 3.0 weight % of molecules having the molecular weight of greater than $10^6$, and using 0.1 weight % of butene-1 as a co-monomer was used for Component I. And homopolypropylene having a weight average molecular weight of $2.5\times10^5$ and melting point of 164° C. was used for Component II. The contents of Component I and Component II were 90 weight % and 10 weight %, respectively. A diluent in which dibutyl phthalate and paraffin oil were mixed at a ratio of 1:2, 100° C. kinetic viscosity was 11 cSt, (Component B in the following table) was used for Component III, and the content of Component III with respect to the entire content of Components I, II, and III was 65 weight %. The temperatures of both the extruder and die were 240° C.

Stretching was done at 118° C. in order to adjust the ratio of melting of the crystal portion to 40 weight % during stretching.

PREFERRED EMBODIMENT 4

High-density polyethylene not containing a co-monomer but having a weight average molecular weight of $3.0\times10^5$ and containing 3.5 weight % of molecules having the molecular weight of lower than $10^4$ and 4.9 weight % of molecules having the molecular weight of greater than $10^6$ was used for Component I. And random polypropylene having a weight average molecular weight of $3.5\times10^5$ and melting point of 157° C., using 0.3 weight % of ethylene as a co-monomer, was used for Component II. The contents of Component I and Component II were 95 weight % and 5 weight %, respectively. Paraffin oil of which 100° C. kinetic viscosity was 11 cSt (Component A in the following table) was used for Component III, and the content of Component III with respect to the entire content of Components I, II, and III was 70 weight W. The temperatures of both the extruder and die were 180° C.

Stretching was done at 119° C. in order to adjust the ratio of melting of the crystal portion to 60 weight % during stretching.

PREFERRED EMBODIMENT 5

High-density polyethylene not containing a co-monomer but having a weight average molecular weight of $2.5\times10^5$ and containing 4.8 weight % of molecules having the molecular weight of lower than $10^4$ and 4.5 weight % of molecules having the molecular weight of greater than $10^6$ was used for Component I. And impact polypropylene having a weight average molecular weight of $4.2\times10^5$, containing 15% of ethylene-propylene co-polymer in homo-polypropylene, and having a melting point of 162° C. was used for Component II. The contents of Component I and Component II were 95 weight % and 5 weight %, respectively. Paraffin oil of which 100° C. kinetic viscosity was 11 cSt (Component A in the following table) was used for Component III, and the content of Component III with respect to the entire content of Components I, II, and III was 75 weight %. The temperatures of both the extruder and die were 240° C.

Stretching was done at 117° C. in order to adjust the ratio of melting of the crystal portion to 50 weight % during stretching.

COMPARATIVE EXAMPLE 1

Polyethylene having a weight average molecular weight of $1.8\times10^5$, containing 22.0 weight % of molecules having the molecular weight of lower than $10^4$ and 1.5 weight % of molecules having the molecular weight of greater than $10^6$, and using 0.8% of butene-1 as a co-monomer was used for Component I. And homopolypropylene having a weight average molecular weight of $2.5\times10^5$ and melting point of 162° C. was used for Component II. The contents of Component I and Component II were 99 weight % and 1 weight %, respectively. Paraffin oil of which 100° C. kinetic viscosity was 11 cSt (Component A in the following table) was used for Component III, and the content of Component III with respect to the entire content of Components I, II, and III was 70 weight %. The temperatures of both the extruder and die were 180° C.

Stretching was done at 114° C. in order to adjust the ratio of melting of the crystal portion to 25 weight % during stretching.

COMPARATIVE EXAMPLE 2

High-density polyethylene not containing a co-monomer but having a weight average molecular weight of $3.0\times10^5$ and containing 3.5 weight % of molecules having the molecular weight of lower than $10^4$ and 4.9 weight % of molecules having the molecular weight of greater than $10^6$ was used for Component I. And homopolypropylene having a weight average molecular weight of $2.5\times10^5$ and melting point of 162° C. was used for Component II. The contents of Component I and Component II were 85 weight % and 15 weight %, respectively. Paraffin oil of which 100° C. kinetic viscosity was 11 cSt (Component A in the following table) was used for Component III, and the content of Component III with respect to the entire content of Components I, II, and III was 70 weight %. The temperatures of both the extruder and die were 180° C.

Stretching was done at 121° C. in order to adjust the ratio of melting of the crystal portion to 85 weight % during stretching.

COMPARATIVE EXAMPLE 3

Polyethylene having a weight average molecular weight of $2.3\times10^5$, and containing 11.6 weight % of molecules having the molecular weight of lower than $10^4$ and 6.4% weight % of molecules having the molecular weight of greater than $10^6$, and further containing 0.6 weight % of butene-1 as a co-monomer was used for Component I. Component II was not used. Paraffin oil of which 100° C. kinetic viscosity was 11 cSt (Component A in the following table) was used for Component III, and the content of Component III with respect to the entire content of Components I and III was 85 weight %. The temperatures of both the extruder and die were 180° C.

Stretching was done at 116° C. in order to adjust the ratio of melting of the crystal portion to 60 weight % during stretching.

COMPARATIVE EXAMPLE 4

The mixture of 25 weight % of ultrahigh-molecular-weight polyethylene having a weight average molecular weight of $8.8\times10^5$ and 75 weight % high-density polyethylene having a weight average molecular weight of $1.8\times10^5$ was used for Component I. The mixture contained 9.4 weight of molecules having the molecular weight of lower than $10^4$, 10.5 weight % of molecules having the molecular weight of greater than $10^6$, and 0.6% butene-1 as a co-monomer. Ter-polypropylene having a weight average molecular weight of $3.1\times10^5$ and a melting point of 131° C. using 3.2 weight % of ethylene and 5.0 weight % of butene-1 as co-monomers was used for Component II. The contents of Component I and Component II were 95 weight % and 5 weight %, respectively. Paraffin oil of which 100° C. kinetic viscosity was 11 cSt (Component A in the following table) was used for Component III, and the content of Component III with respect to the entire content of Components I, II, and III was 70 weight %. The temperatures of both the extruder and die were 180° C.

Stretching was done at 119° C. in order to adjust the ratio of melting of the crystal portion to 60 weight % during stretching.

COMPARATIVE EXAMPLE 5

Polyethylene using 0.8% of butene-1 as a co-monomer and having a weight average molecular weight of $1.8\times10^5$ and containing 22.0 weight % of molecules having the molecular weight of lower than $10^4$ and 1.5 weight % of molecules having the molecular weight of greater than $10^6$ was used for Component I. And talc powder, which was an inorganic material, having the size of 0.2-10 μm was used for Component II. The contents of Component I and Component II were 95 weight % and 5 weight %, respectively. Paraffin oil of which 100° C. kinetic viscosity was 11 cSt (Component A in the following table) was used for Component III, and the content of Component III with respect to the entire content of Components I, II, and III was 40 weight %. The temperatures of both the extruder and die were 180° C.

Stretching was done at 120° C. in order to adjust the ratio of melting of the crystal portion to 30 weight % during stretching.

TABLE 1

| | Manufacturing Conditions | Units | Preferred Embodiments 1 | 2 | 3 | 4 | 5 |
|---|---|---|---|---|---|---|---|
| Polyethylene (Component I) | Mw | g/mol | $3.0 \times 10^5$ | $2.5 \times 10^5$ | $2.9 \times 10^5$ | $3.0 \times 10^5$ | $2.5 \times 10^5$ |
| | Mw < $10^4$ | wt % | 3.5 | 4.8 | 4.9 | 3.5 | 4.8 |
| | Mw > $10^6$ | wt % | 4.9 | 4.5 | 3.0 | 4.9 | 4.5 |
| | Co-Monomer | wt % | 0.0 | 0.0 | 0.1 | 0.0 | 0.0 |
| | Content in Components I + II | wt % | 95 | 97 | 90 | 95 | 95 |
| Polypropylene (Component II) | Mw | g/mol | $5.7 \times 10^5$ | $2.9 \times 10^5$ | $2.5 \times 10^5$ | $3.5 \times 10^5$ | $4.2 \times 10^5$ |
| | Melting Point | °C. | 162 | 162 | 164 | 157 | 162 |
| | Content in Components I + II | wt % | 5 | 3 | 10 | 5 | 5 |
| Diluent (Component III) | Type | — | A | B | B | A | B |
| | Content in Components I + II + III | wt % | 70 | 60 | 65 | 70 | 75 |
| Stretching | Temperature | °C. | 115 | 120 | 118 | 119 | 119 |
| | Melting of Crystals | % | 30 | 50 | 40 | 60 | 70 |
| | Extrusion Processability | — | Sup. | Sup. | Sup. | Sup. | Sup. |
| | Puncture Strength | N/μm | 0.23 | 0.20 | 0.22 | 0.17 | 0.15 |
| | Air Permeability | Darcy ($\times 10^{-5}$) | 1.9 | 2.5 | 2.1 | 3.0 | 3.7 |
| Thermal Characteristic | Shut-down Temperature | °C. | 136 | 136 | 136 | 135 | 134 |
| | Melt-Down temperature | | 193 | 183 | >200 | 178 | 187 |

(sup.: superior)

TABLE 2

| | Manufacturing Conditions | Units | Comparative Examples 1 | 2 | 3 | 4 | 5 |
|---|---|---|---|---|---|---|---|
| Polyethylene (Component I) | Mw | g/mol | $1.8 \times 10^5$ | $3.0 \times 10^5$ | $2.3 \times 10^5$ | $8.8 \times 10^5$ (25 wt %) $1.8 \times 10^5$ (75 wt %) | $1.8 \times 10^5$ |
| | Mw < $10^4$ | wt % | 22.0 | 3.5 | 11.6 | 9.4 | 22.0 |
| | Mw > $10^6$ | wt % | 1.5 | 4.9 | 6.4 | 10.5 | 1.5 |
| | Co-Monomer | wt % | 0.8 | 0.0 | 0.6 | 0.6 | 0.8 |
| | Content in Components I + II | wt % | 99 | 85 | 100 | 95 | 95 |
| Polypropylene (Component II) | Mw | g/mol | $2.5 \times 10^4$ | $2.5 \times 10^5$ | — | $3.1 \times 10^5$ | Talc |
| | Melting Point | °C. | 162 | 164 | — | 131 | |
| | Content in Components I + II | wt % | 1 | 15 | — | 5 | 5 |
| Diluent (Component III) | Type | — | A | A | A | A | A |
| | Content in Components I + II + III | wt % | 70 | 70 | 85 | 70 | 40 |
| Stretching | Temp. | °C. | 114 | 121 | 116 | 119 | 120 |
| | Melting of Crystals | % | 25 | 85 | 60 | 60 | 30 |
| | Extrusion Processability | — | Sup. | Sup. | Inf. | Inf. | Inf. |
| | Puncture Strength | N/μm | 0.25 | 0.11 | 0.13 | 0.22 | 0.25 |
| | Air Permeability | Darcy ($\times 10^{-5}$) | 1.3 | 4.0 | 4.2 | 2.0 | 0.8 |
| Thermal Characteristic | Shut-down Temperature | °C. | 135 | 136 | 137 | 135 | 135 |
| | Melt-Down temperature | | 149 | >200 | 145 | 140 | 154 |

(sup.: superior, inf.: inferior)

As shown in the above Tables 1 and 2, high-density microporous polyolefin films manufactured according to the present invention have a high thermal stability and superior extrusion compoundability and physical properties. And therefore, they are applicable usefully to not only separation membranes for batteries but also various separation membranes since they can enhance the performance and stability of the batteries using them as well as the productivity of microporous films.

While certain present preferred embodiments and comparative examples of the invention have been shown and described, it is to be distinctly understood that the invention is not limited thereto but may be otherwise variously embodied and practiced within the scope of the following claims.

What is claimed is:

1. A method of manufacturing microporous polyolefin films having a puncture strength greater than 0.14 N/μm, a Darcy's permeability constant greater than $1.5 \times 10^{-5}$ Darcy, a shut-down temperature lower than 140° C., and a melt-down temperature higher than 160° C. comprising the steps of:
   melt-extruding a composition comprising 20-50 weight % of a resin composition and 80-50 weight % of a diluent (Component III) to mold in the form of sheets,
   wherein the resin composition comprises a blend of:
   (a) 90-98 weight % of polyethylene (Component I) having a weight average molecular weight of $2 \times 10^5 \sim 4 \times 10^5$ and less than 5 weight % of molecules of which molecular weight is less than $1 \times 10^4$ and less than 5 weight % of molecules of which molecular weight is greater than $1 \times 10^6$, and
   (b) 2-10 weight % of polypropylene (Component II) having a weight average molecular weight of $3.0 \times 10^4 \sim 8.0 \times 10^5$ and a peak melting point higher than 145° C.;
   stretching said sheets to mold in the form of films;
   extracting said diluent from said films; and
   heat-setting said films.

2. The method of manufacturing microporous polyolefin films in claim 1, characterized by that said microporous polyolefin films have a weight average molecular weight of $2.0 \times 10^5 \sim 4.5 \times 10^5$ and the peak of the melting point of higher than 145° C.

3. The method of manufacturing microporous polyolefin films in claim 1, characterized by that said Component I is homopolyethylene or polyethylene co-polymers containing less than 20 weight % of alpha-olefin having 3-8 carbon atoms or their mixture as comonomers, or the mixture of said homopolyethylene and said polyethylene co-polymer.

4. The method of manufacturing microporous polyolefin films in claim 1, characterized by that said Component II is homopolypropylene; or random polypropylene containing ethylene or alpha-olefin having 3-8 carbon atoms or the mixture of said ethylene and alpha-olefin as comonomers; or polypropylene containing polypropylene copolymers containing ethylene or alpha-olefin having 3-8 carbon atoms or their mixture of said ethylene and alpha-olefin as comonomers; or the mixture of said homopolypropylene, said random polypropylene, and said polypropylene, which is a polypropylene having the peak of the melting point higher than 145° C.

5. The method of manufacturing microporous polyolefin films in claim 1, characterized by that the ratio of said Component I and said Component II is 95-97 weight % to 3-5 weight %.

6. The method of manufacturing microporous polyolefin films in claim 1, characterized by that said Component III is one or more components selected from aliphatic or cyclic hydrocarbons selected from the group consisting of nonane, decane, decalin and paraffin oil; phthalic acid esters selected from the group consisting of dibutyl phthalate and dioctyl phthalate; aromatic ethers; fatty acids having 10 to 20 carbon atoms selected from the group consisting of stearic acid, oleic acid, linoleic acid and linolenic acid; fatty acid alcohols having 10 to 20 carbon atoms selected from the group consisting of stearyl alcohol and oleyl alcohol; and one or more fatty acid esters in which one or more fatty acids selected from saturated and unsaturated fatty acids having 4 to 26 carbon atoms in the fatty acid group selected from the group consisting of palmitic acid mono-, di-, or tri-ester, stearic acid mono-, di-, or tri-ester, oleic acid mono-, di-, or tri-ester, linoleic acid mono- and di-, or tri-ester are ester-bonded with alcohols having 1 to 8 hydroxy radicals and 1 to 10 carbon atoms.

7. The method of manufacturing microporous polyolefin films in claim 1, characterized by that said step of stretching is done within a temperature range at which 30-80 weight % of the crystal portion of said Component I is molten in the machine and transverse directions greater than 3 times each at the total stretching ratio of 25-50 times.

* * * * *